United States Patent [19]

Manor

[11] Patent Number: 4,926,773
[45] Date of Patent: May 22, 1990

[54] HIGH PERFORMANCE SEA-GOING CRAFT

[76] Inventor: Yehuda Manor, 1 Giladi Street, Jerusalem 93385, Israel

[21] Appl. No.: 204,300

[22] Filed: Jun. 9, 1988

[30] Foreign Application Priority Data

Jun. 12, 1987 [GB] United Kingdom ............... 87 13767

[51] Int. Cl.⁵ ............................................ B63B 35/72
[52] U.S. Cl. ...................................... 114/61; 114/274; 114/280; 440/88
[58] Field of Search ...................... 114/56, 57, 61, 274, 114/280, 281, 282; 244/135 B; 440/88

[56] References Cited

U.S. PATENT DOCUMENTS

| Re. 28,615 | 11/1975 | Keiper | 114/281 |
|---|---|---|---|
| 2,404,418 | 7/1946 | Walker | 244/135 B |
| 3,456,609 | 7/1969 | Nott | 114/282 |
| 3,917,022 | 11/1975 | Brooks | 114/61 |
| 4,080,922 | 3/1978 | Brubaker | 114/282 |
| 4,423,695 | 1/1984 | Bougerie | 114/61 |
| 4,449,472 | 5/1984 | Meyer | 114/274 |

FOREIGN PATENT DOCUMENTS 138193 12/1978 Japan ........................... 114/61

Primary Examiner—Sherman D. Basinger
Assistant Examiner—Stephen P. Avila
Attorney, Agent, or Firm—Shoemaker and Mattare, Ltd.

[57] ABSTRACT

A sea-going craft has a main central body with two wings affixed to the body and extending horizontally away to either side. A catamaran-type hull is attached to each wing end, and provides flotation. The rearward edge of each wing is generally closer to the water than the forward edge when the craft is under power, thus adding lift due to the ground-effect phenomenon. A hydrofoil is affixed to each hull and extends downwardly, and a third hydrofoil is affixed to the central body, extending downwardly. The craft includes propulsion apparatus.

8 Claims, 5 Drawing Sheets

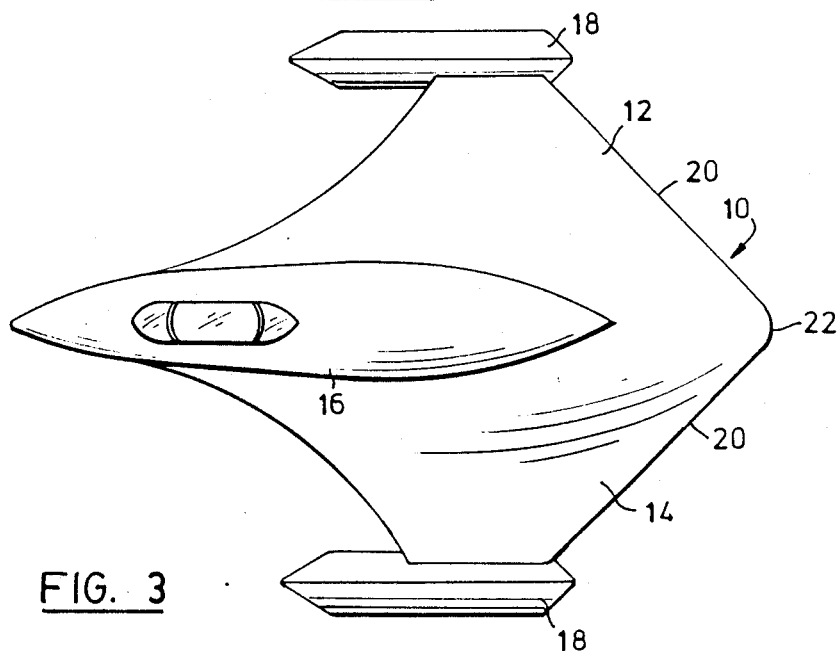
FIG. 2
FIG. 3
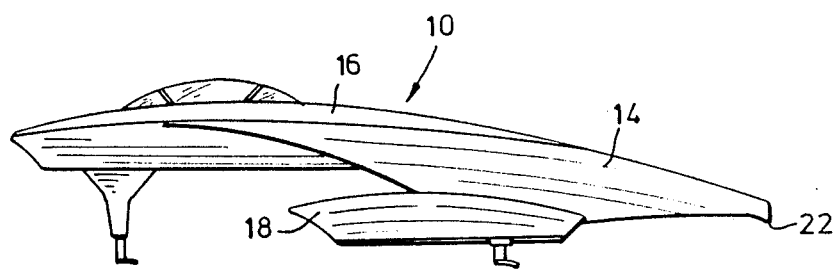
FIG. 4

HIGH PERFORMANCE SEA-GOING CRAFT

This invention relates generally to a high performance water craft, which may be either manned or unmanned, combining the principles of a hydrofoil and a ground effect machine.

GENERAL DESCRIPTION OF THIS INVENTION

Because the craft described herein is unlike any previously known design, this specification will utilize the term "Wigfoil", based on the expression "wing in groundeffect" (WIG) in combination with the word "hydrofoil".

The craft of this invention is essentially a flight vehicle meant to be flown in close proximity to the sea surface, thereby achieving a very high transport efficiency in terms of the aerodynamic Lift/Drag ratio. However, the craft employs the hydrofoil principle, which involves foils located beneath the surface of the water at all times. A fully submerged hydrofoil requires control of the submergence depth of its foils, thereby effectively controlling the height of the craft above the water. This characteristic fits well with the nature of the WIG, where the height above the surface is an essential parameter.

One of the advantages of the proposed combination is higher transport efficiency compared with a hydrofoil at high velocities, due to the following reason: At the present time, fully submerged hydrofoils use foil sections known as Subcavitating. They are considered efficient—again in terms of lift/drag ratios but they are limited to speeds of 40-45 Knot, due to the onset of cavitation and an attendant drag increase. Other sections are being developed for use at higher speeds, known as supercavitating and air-fed foil types. Characteristically, they have lower efficiencies than subcavitating foils. Conversely, an aerodynamic lifting surface (wing) flown in ground effect can achieve very high L/D ratios. Thus, the combination of the two lifting systems will have a better total L/D than the hydrofoils alone.

Another advantage of the WIGFOIL concept compared to a WIG alone is as follows: A wing-in-ground-effect craft "feels well" over flat water. Once the water becomes substantially wavy, it becomes problematic. It has to be flown higher, thereby losing its efficiency. Descent, after an inadvertent pull-up, may also be difficult. A WIGFOIL, due to its foil system, can be flown more safely near the water. Especially in large waves, it can be made to follow the actual sea profile. This is known as "contouring" in hydrofoil terminology. Also, in the case of low visibility, it is safer due to the physical contact with the water through the foils at all times. Finally, in case of an inadvertent contact of the hull/wing with the water, a WIGFOIL will have a better chance, as in the case of a hydrofoil hull/water contact, whereas a WIG craft alone many behave like an airplane in water contact, which usually is catastrophic.

A fully-submerged hydrofoil type is characterized by lack of natural stability in the heave and roll modes, whereas a wing-in-ground-effect possesses these stabilities because-of-a strong gradient of lift vs. height in proximity to ground (or water). Thus, the need for fast automatic control is partially alleviated.

Another advantage compared to a wig alone is a higher payload carrying capability for vehicles of roughly the same size. This should be so because the aerodynamic lift achievable is closely related to the wing area which in turn is closely related to the craft size, whereas the hydrodynamic lift does depend on the hydrofoils surface area, but these are very small, and a lot of lift can be added without changing much the total planform area of the vehicle.

More particularly, this invention provides a seagoing craft comprising:
- a main central body,
- two wings affixed to said body and extending generally horizontally away therefrom to either side,
- a catamaran-type hull affixed to each wing remote from the central body, the hulls being adapted to provide flotation,
- each wing having a forward edge and a rearward edge, each rearward edge extending obliquely and smoothly from the respective catamaran-type hull to a rearward location behind the central body, each rearward edge further being substantially closer to the water than the forward edge when the craft is under power, whereby the wings can exhibit the wing-in-ground-effect to produce ram lift,
- a hydrofoil affixed to each hull and extending downwardly therefrom, and a third hydrofoil affixed to the central body and extending downwardly therefrom,
- and means for propelling the craft.

GENERAL DESCRIPTION OF THE DRAWINGS

Two embodiments of this invention are illustrated in the accompanying drawings, in which like numerals denote like parts throughout the several views, and in which:

FIGS. 2, 3 and 4 are front elevation, plan and side elevational views of the craft of FIG. 1;

FIG. 8 is a perspective view of the further embodiment of the invention, showing various forces involved in the basic design considerations; and

DETAILED DESCRIPTION OF THE DRAWINGS

Figure 1:
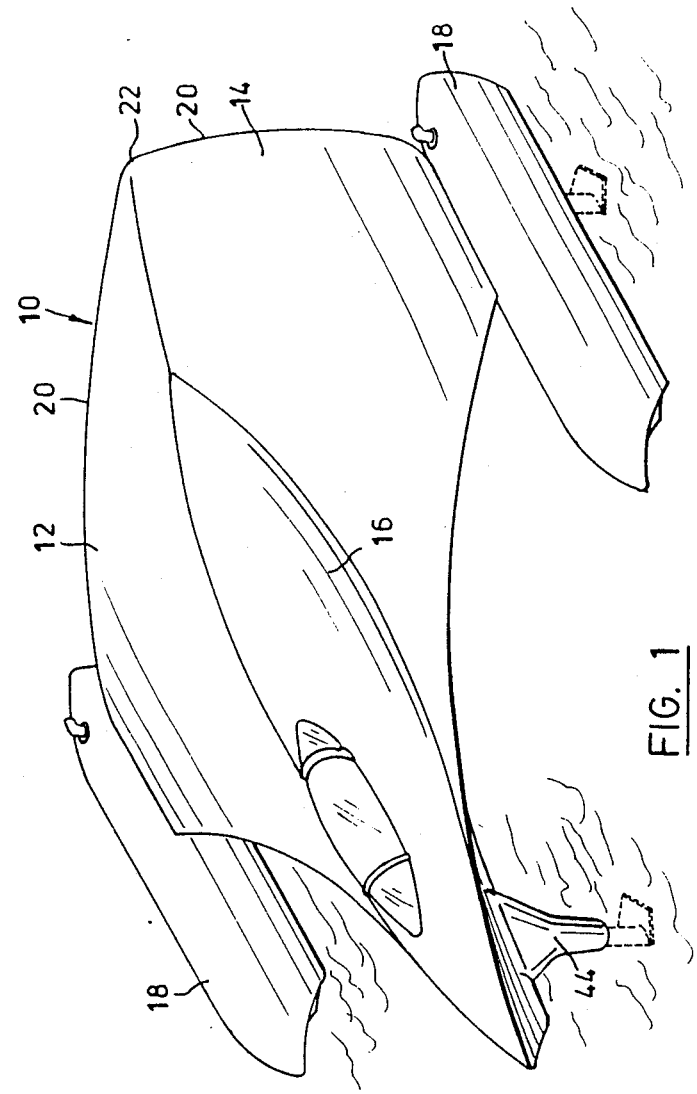
FIG. 1 is a perspective view of one embodiment of the craft to which this invention is directed.

As can be seen in FIGS. 1-4, the craft 10 comprises two curved wing surfaces 12 and 14 which extend outwardly from a central cabin or body 16 to terminate in respective catamaran hulls 18. The trailing edge 20 of the wings 12 and 14 is swept forward, as best seen in FIGS. 1 and 3. As particularly well seen in FIGS. 2 and 4, this configuration defines a cavity under the wings 12 and 14 which is open in the direction of flight, but relatively closed in the opposite direction. By virtue of this configuration, air becomes trapped under the flying vehicle and the ram pressure which results adds to the lift. Aerodynamically, the effect is known and has been utilized in WIG craft designs in the past.

The aerodynamic part of the craft to which this invention is directed should have substantially neutral lateral (dihedral) and directional (weathercock) stabilities, with respect to side wind components. The first of these is achieved by balancing between the wing's leading edge sweep and its anhedral angle, while the second is achieved by not fitting a vertical stabilizer. The reason for this is that there is sufficient directional and lateral stability and control from the computer controlled foil system, on the one hand, and on the other hand, it is desired that the aerodynamic part should not react to wind gusts from different directions, which would be disturbing, if not dangerous.

When the craft 10 is stationary, it floats on the two catamaran hulls 18 and (optionally) the furthest aft point on the wing's trailing edge. This is identified by the numeral 22. The centre of gravity of the craft lies well within this triangle. In floatation attitude, the wing should have a tendency to pitch nose down to make sure the craft does not turn over as a result of a strong head-on gust.

Each of the catamaran hulls 18 doubles as a fuel tank similar to an airplane wingtip tank. Each of the catamaran hulls has a special internal construction based on the requirement for the craft to be able to follow the wave contour at high speed, particularly in an unmanned version. Usually, wave crests have a larger curvature than troughs, and for this reason the craft will have to perform relatively high values of negative vertical acceleration followed by positive values in rapid succession (negative and positive values of "g").

Figure 5:
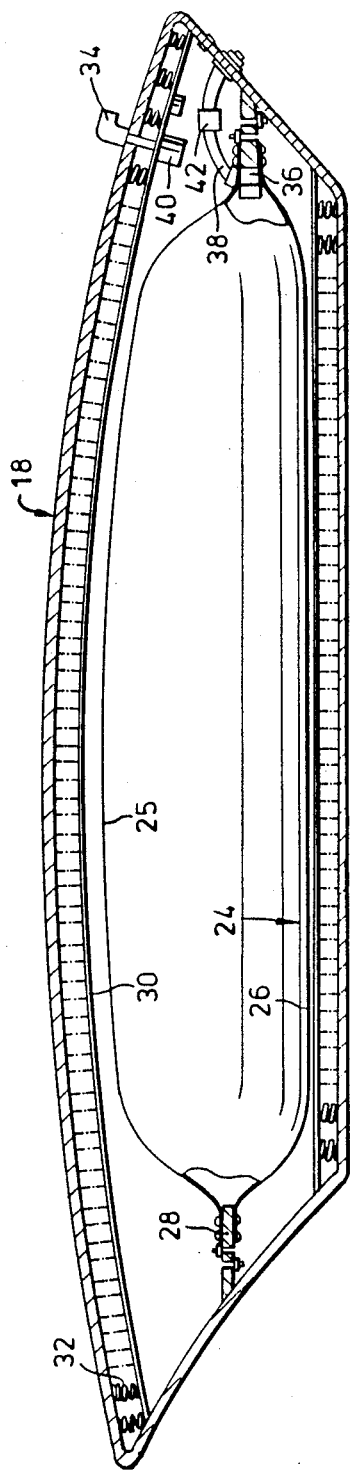
FIG. 5 is a longitudinal sectional view through a catamaran hull and fuel tank forming part of the craft of FIG. 1.

A typical fuel tank used in a regular aeronautical construction may not be good enough to ensure fuel supply in the present invention without interruption due to the lack of pump immersion in the fuel. In the present concept, as seen in FIG. 5, the fuel is contained at all times within a flexible bladder-type cell 24. The flexible bladder is made out of an upper part 25 and a lower part 26, and these parts are secured above and below an inwardly projecting flange 28 running around the catamaran hull 18 on the inside. The internal surface of the hull 18, particularly the top and bottom, is covered by a lining 30 which is supported by sets of springs 32 somewhat in the manner of a typical mattress. The function of the lining 30 is to cushion the bladder 24 and protect it from hard contact with the hull 18.

The hull is internally pressurized with air drawn through an intake 34 at the top back side of the hull 18, the intake 34 being located so as to minimize the entry of sea water. All other equipment is also located at the back of the hull, since there is thus a smaller chance of water contact. A fuel pump 36 is provided at the back end of the bladder 24, where it can be attached to the solid part of the hull 18. Fuel mass flow and fuel pressure sensors 42 are located on the fuel pressure line 38. The fuel pressure reading is used by the hull pressurization computer which manipulates the air compressor 40 in such a way as to produce enough air pressure on the bladder so that the fuel pressure reading will not drop under a certain prescribed minimum level. In the case of the fuel pressure going up too much for any reason, the computer will direct the hull pressure relief valve to open momentarily.

As the craft performs high value vertical accelerations, the fuel mass, together with the bladder 24, will move up and down in the hull 18. The compressed air in the hull will provide a cushioning effect for these movements. Since the pressure on one side may become very high and on the other side very low, pressure equalizing valves between the top and bottom of the hull are provided at various locations around the hull, allowing air to flow between the sides once a certain difference develops. These valves are also necessary because the air compressor discharges into the upper half alone.

The fuel filling line (not shown) enters the bladder near the location of the pump 36 and it consists of a hermetic lead, a one way valve allowing fuel flow only in the filling direction and a fuel mass flow transducer.

Since in this type of fuel tank a mechanical type device for fuel quantity measurement is not feasible, the available amount is determined only electronically in the fuel quantity computer. Fuel mass flow readings in the filling stage and the operation stage are integrated and subtracted to give the available amount. A certain minimum amount of fuel in the tank exists under which the shape of the bladder cannot be guaranteed and fuel may not arrive at the pump.

Figure 6:
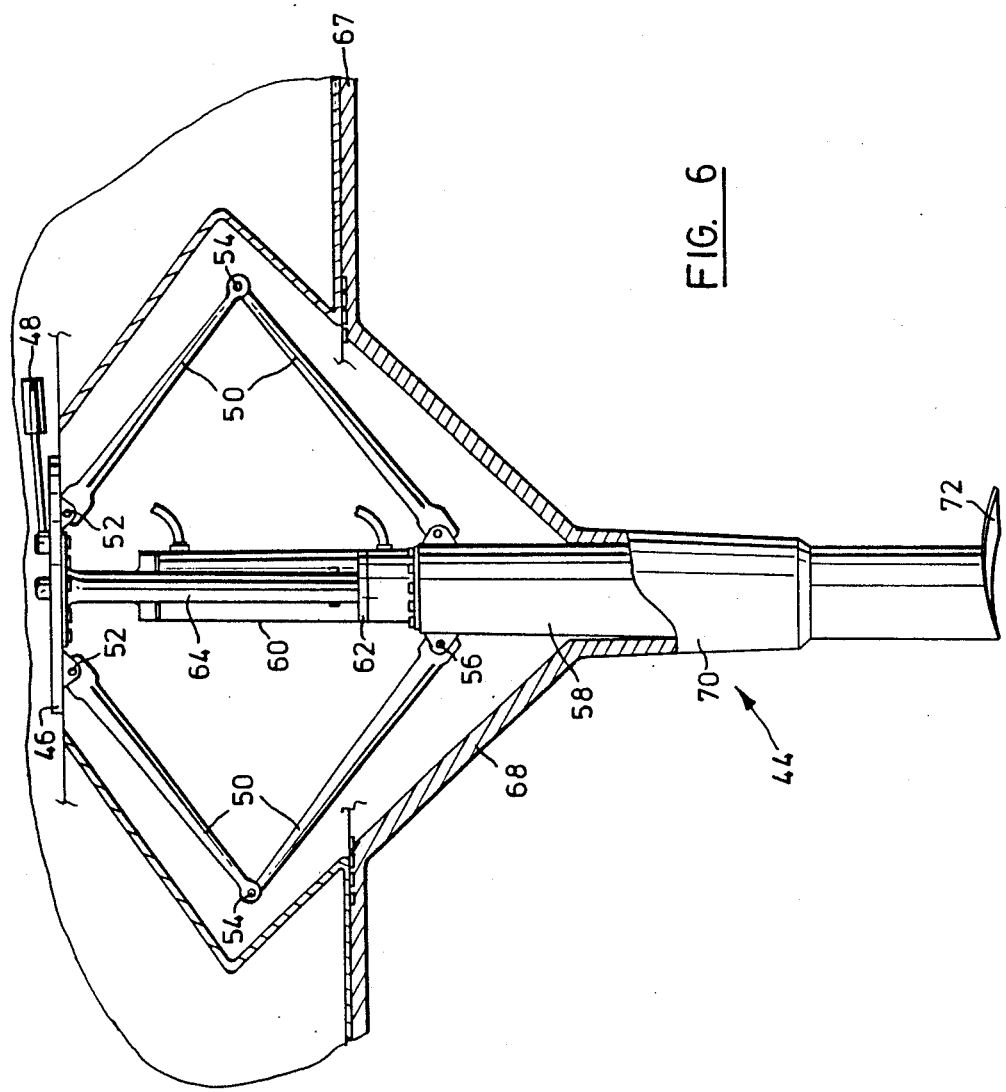
FIG. 6 is a vertical sectional view through the forward extendable strut supporting the foil within the water.

Attention is now directed to FIG. 6, which is a partial vertical sectional view through the front extendable strut 44 seen in FIG. 1. In FIG. 6, the strut 44 is mounted under a rotatably mounted plate 46, and includes a hydraulic rudder actuator 48, and a pair of torque arms 50. Each pair of torque arms includes an upper arm pivoted at 52 to the plate 46 and having its other end pivoted at 54 to one end of a lower arm. The other end of the lower arm is pivoted at 56 to an extendable strut 58. The extendable strut has secured to it a strut hydraulic actuator 60 within which is slidably positioned a piston 62 secured to a piston rod 64 extending upwardly and axially out of the actuator 60. The piston rod 64 is secured at the top to the plate 46. Shown in FIG. 6 is the vehicle skin 67 which forms a housing 68 which converges downwardly to merge with an aerodynamic fairing 70 which is also a sea water shield. The strut 58 has at its lower end a foil 72, which may be of the supercavitating type, or other high-speed technology foil much as the air-fed type.

It will be appreciated that the construction just described allows the strut's length to be changed on command from the craft's central flight control system. While this capability has been described with respect to the forward strut only, it will be appreciated that it is the intention that all of the struts, which may be three or more, possess this capability.

Moreover, this construction should not be confused with shock struts common in aircraft landing gears. The extendable strut 58 is not meant to provide any damping effect, but rather to change its length accurately and quickly at the rate set by the flight control system. The reasons and advantages of this concept are as follows:

(a) When flying over calm, flat water, it is desirable that the foils be as close to the surface as possible, subject to a certain minimum associated with undesirable penetration of air from the surface towards the foil. This is in the interest of minimizing strut drag. The wing should also be flown as close to the surface as possible in order to achieve high L/D values. These two requirements dictate that at calm sea, the struts should be short. Right away, this clashes with the need to roll the craft in order to execute a turn as is the practice in both hydrofoils and WIG airplanes. Therefore, in order to perform a banked turn, the WIG is raised from the water by way of extending the struts.

(b) When the sea becomes wavy, it is the practice of fully submerged type hydrofoil operators to lower the foils somewhat into the sea, this way keeping the foils from inadvertently breaking out of the water. This phenomenon, known as Broaching, is undesirable since it causes loss of lift and possible water contact with the hull. In a regular hydrofoil craft, the lowering of the foils is done at the expense of the keel height above the water. In the present case, since the struts are normally short, it is done by extending the struts, this way enabling the foils to fly deeper while the craft is still above the wave crests. The centre of gravity of the craft follows a path close to a straight, level line in this mode of flying, which is known in hydrofoil terminology as "platforming".

(c) Once the waves become too high for the execution of platforming, it is the practice in hydrofoil crafts to switch to another mode of operation of the flight control system which directs the craft to follow the contour of the sea. This mode is known as "contouring". A WIG aircraft in such conditions will be forced to leave the surface of the sea and be flown higher up, or not be flown at all. The wigfoil extendable struts allow another mode of operation: The foils are controlled in an ordinary "contouring" mode to follow the sea profile by adherence to a constant, prescribed depth of submergence. Since the craft is intended to be flown at high speeds following the sea profile, negative and positive vertical accelerations can become difficult, if not impossible, for the passengers to bear. Therefore, the struts, length is manipulated in such a way as to counter these accelerations. As the WIGFOIL follows a wave crest, executing a negative "g", the struts are lengthened, thereby lifting the craft momentarily and adding an artificial positive "g" component. In a wave trough the struts are commanded to shorten, thereby adding an artificial negative "g" component. This "elevator effect", monitored by the flight control system, improves the ride quality and effectively extends the operational envelope of the craft.

(d) A mixed operational mode, combining the modes described above, would also be available.

By utilizing the rudder actuator 48, the extendable strut 58 can be turned sideways to a limited extent, thereby providing a rudder effect at the part of the strut travelling in the water. This is an accepted practice in hydrofoil craft design, one example of which is the Boeing JETFOIL.

The propulsion of this craft may be by air propellers, underwater or surface-piercing propellers, or a waterjet system.

Figure 8:
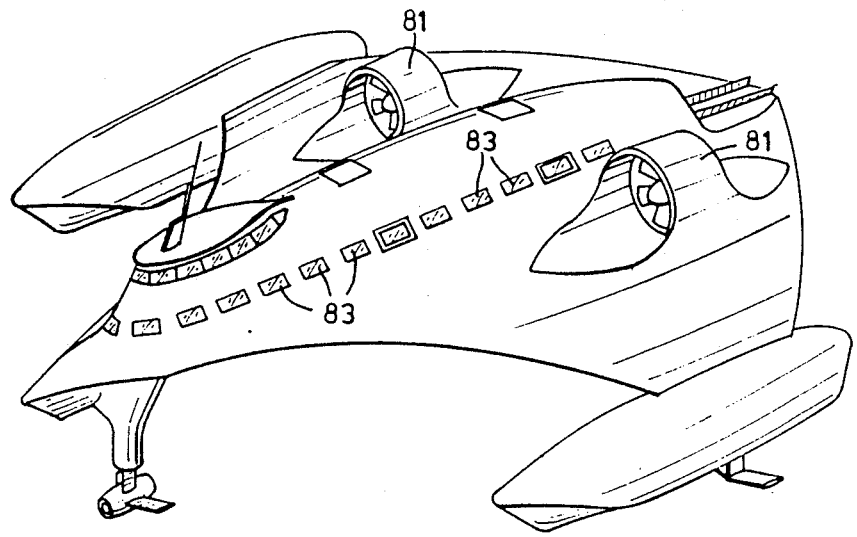
FIG. 8 is a perspective view of the further embodiment of the craft to which this invention is directed.

In the embodiment illustrated in FIG. 8 of the drawings, the propulsion means for the craft is shown to comprise two air propellers 81. Otherwise the basic design of the craft shown in FIG. 8 is very similar to that shown in FIG. 1. The embodiment in FIG. 8 has a longer passenger cabin, as indicated by the windows 83.

BASIC DESIGN CONSIDERATIONS

In order to get some insight into the design problem, let us use a simplified mathematical model of the forces involved.

Figure 7:
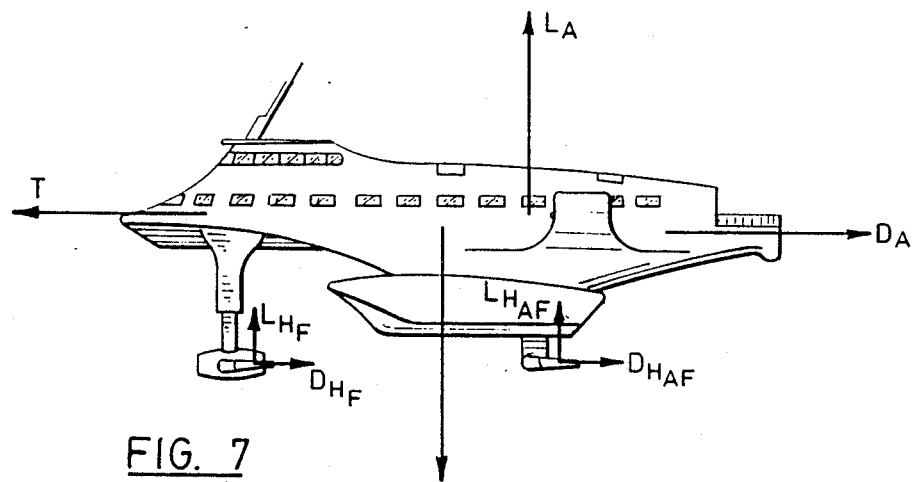
FIG. 7 is a side elevational view of another embodiment of the invention, showing various forces involved in the basic design considerations.

We assume the craft is cruising at a steady velocity and all forces and moments are in equilibrium, as seen in FIG. 7, where:
L = Lift Forces
VV = Total Weight
T = Engines Thrust
D = Drag Forces
V = Velocity
sub. A = Aerodynamic
sub. H = Hydrodynamic we now add up the forces and write $$L_{total} = L_A + L_H = W$$

$$D_{total} = D_A + D_H = T$$

where the hydrodynamic terms include both forward and aft foils. In the interest of simplicity, we will now continue to regard the underwater part as consisting of one representative foil. Now let us write:

$$L_{total} = \tfrac{1}{2}\rho_A V^2 S_A C_{Ltotal} = \tfrac{1}{2}\rho A_2 S_A C_{LA} + \tfrac{1}{2}\rho_H V^2 S_H C_{LH}$$

where:

$\rho_A, \rho_H$ —air and water densities respectively.
$S_A, S_H$—airfoil and hydrofoil reference areas respectively.
$C_L$—coefficient of lift.

Here in effect we have defined $C_{Ltotal}$:

$$C_{Ltotal} = C_{LA} + \frac{\rho_H}{\rho_A} * \frac{S_H}{S_A} * C_{LH}$$

Let us define:

$$A^* \triangleq \frac{\rho_H}{\rho_A} * \frac{S_H}{S_A}$$

and now:

$$CL_{total} = C_{LA} + A^* C_{LH}$$

If we assume both air and water lift systems have parabolic drag polars of the form:

$$C_D = C_{DO} + K C_L^2, \text{ we get:}$$

$$C_{Dtotal} = C_{DOtotal} = K_A C_{LA}^2 = A^* K_H C_{LH}^2$$

in which:

$$C_{DOtotal} \triangleq C_{DOA} = A^* C_{DOH}$$

We now proceed in analogy to the practice in aerodynamics and define the combined aerohydrodynamic efficiency as:

$$E_{total} \triangleq \frac{L_{total}}{D_{total}} = \frac{C_{Ltotal}}{C_{Dtotal}}$$

Additional algebra shows that if we want to maximize the combined efficiency defined above for a given design, we have to set the hydrodynamic lift coefficient at:

$$C_{LH} = \sqrt{\frac{C_{DOtotal}}{K_H \left( A^* + \frac{K_H}{K_A} \right)}}$$

The aerodynamic lift coefficient should be set at:

$$C_{LA} = -A^*C_{LH} + \sqrt{A^{*2}C_{LH}^2 + A^* \frac{K_H}{K_A} \cdot C_{LH}^2 + \frac{C_{DOtotal}}{K_A}}$$

and the combined efficiency then becomes:

$$E_{total} = \frac{1}{2K_A C'_{LA}}$$

In regards to the parameter $A^*$ which primarily represents the area ratio of the hydrodynamic and aerodynamic lifting surfaces $S_H/S_A$—another parameter:

$$\dot{Z} \triangleq \frac{C_{LH}/C_{DH}}{C_{LA}/C_{DA}}$$

at the design point, should be consulted. If $\dot{Z} > 1$, which usually would be the case, then $A^*$ should be reduced as much as possible, considering all other pertaining constraints. This can be achieved by either increasing the aerodynamic area or by reducing the hydrodynamic area, or both.

While one embodiment of this invention has been described hereinabove and illustrated in the accompanying drawings, it will be understood by those skilled in the art that changes and modifications may be made therein without departing from the essence of the invention, as set forth in the appended claims.

The embodiments of the invention in which an exclusive property or privilege is claimed are defined as follows:

1. A sea-going craft comprising: a main central body, two wings affixed to said body and extending generally horizontally away therefrom to either side, a catamaran-type hull affixed to each wing remote from the central body, the hulls being adapted to provide flotation,
each wing having a forward edge and a rearward edge, each rearward edge extending obliquely and smoothly from the respective catamaran-type hull to a rearward location behind the central body, each rearward edge further being substantially closer to the water than the forward edge when the craft is under power, whereby the wings can exhibit the wing-in-ground-effect to produce ram lift,
a hydrofoil affixed to each hull and extending downwardly therefrom, and a third hydrofoil affixed to the central body and extending downwardly therefrom,
and means for propelling the craft.

2. The invention claimed in claim 1, in which each hull contains a fuel compartment.

3. The invention claimed in claim 1, in which the forward edge of each wing is swept back, while the rearward edge of each wing is swept forward.

4. The invention claimed in claim 1, in which the vertical position of each hydrofoil with respect to the craft is adjustable.

5. The invention claimed in claim 1, in which all hydrofoils are supercavitating.

6. The invention claimed in claim 2, in which each hull contains a bladder which defines the respective fuel compartment, and means defining shock-absorbant layers above and below the bladder.

7. The invention claimed in claim 1, in which the hydrofoil affixed to the central body is forward of the other two hydrofoils and is steerable.

8. The invention claimed in claim 6, in which the hydrofoil affixed to the central body is forward of the other two hydrofoils and is steerable, in which the forward edge of each wing is swept back, while the rearward edge of each wing is swept forward, in which the vertical position of each hydrofoil with respect to the craft is adjustable, and in which all hydrofoils are supercavitating.

* * * * *